United States Patent
Cho et al.

(10) Patent No.: US 12,283,407 B2
(45) Date of Patent: Apr. 22, 2025

(54) HIGH-VOLTAGE POWER CABLE

(71) Applicant: LS CABLE & SYSTEM LTD., Anyang-si (KR)

(72) Inventors: Young Eun Cho, Seoul (KR); Sue Jin Son, Gunpo-si (KR); Yeo Ool Shin, Jungnang-gu (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 44 days.

(21) Appl. No.: 18/014,983

(22) PCT Filed: Jul. 6, 2021

(86) PCT No.: PCT/KR2021/008612
§ 371 (c)(1),
(2) Date: Jan. 6, 2023

(87) PCT Pub. No.: WO2022/010244
PCT Pub. Date: Jan. 13, 2022

(65) Prior Publication Data
US 2023/0260678 A1  Aug. 17, 2023

(30) Foreign Application Priority Data

Jul. 7, 2020 (KR) .......................... 10-2020-0083484
Jul. 6, 2021 (KR) .......................... 10-2021-0088557

(51) Int. Cl.
*H01B 9/02* (2006.01)
*G01N 25/48* (2006.01)
(Continued)

(52) U.S. Cl.
CPC ......... *H01B 9/027* (2013.01); *G01N 25/4866* (2013.01); *H01B 3/30* (2013.01); *H01B 7/0275* (2013.01)

(58) Field of Classification Search
CPC ...................................................... H01B 9/027
(Continued)

(56) References Cited

U.S. PATENT DOCUMENTS 3,987,239 A * 10/1976 Chen .................... H01B 7/0208
174/121 R
5,358,786 A * 10/1994 Ishikawa ................ H01B 7/292
174/120 SR
(Continued)

FOREIGN PATENT DOCUMENTS

CN 103930953 A 7/2014
EP 2950313 A1 12/2015
(Continued)

OTHER PUBLICATIONS

International Search Report for related International Application No. PCT/KR2021/008612; report dated Jan. 13, 2022; (5 pages).
(Continued)

*Primary Examiner* — Chau N Nguyen
(74) *Attorney, Agent, or Firm* — K&L Gates LLP

(57) ABSTRACT

Provided is a high-voltage power cable. Specifically, the present disclosure relates to a high-voltage power cable that exhibits excellent dielectric strength, such as dielectric breakdown voltage and impulse breakdown strength, and that is capable of implementing and maintaining dielectric characteristics even when a temperature of a cable insulator rises due to the transmission of power or when negative impulse or polarity reversal occurs.

4 Claims, 2 Drawing Sheets

(51) Int. Cl.
*H01B 3/30* (2006.01)
*H01B 7/02* (2006.01)

(58) Field of Classification Search
USPC .................... 174/102 SC, 120 SC, 120 R
See application file for complete search history.

(56) References Cited

U.S. PATENT DOCUMENTS

| | | | | |
|---|---|---|---|---|
| 5,481,070 | A | * | 1/1996 | Hirose ................. H01B 9/0688 174/120 FP |
| 9,984,789 | B2 | * | 5/2018 | Briceno Garcia ....... H01R 4/10 |
| 2014/0084102 | A1 | * | 3/2014 | Techlin .............. B65H 75/2455 242/520 |
| 2014/0251654 | A1 | * | 9/2014 | Liu ..................... H01B 9/0688 174/25 R |

FOREIGN PATENT DOCUMENTS

| | | |
|---|---|---|
| EP | 3633693 A1 | 4/2020 |
| KR | 1020160106581 A | 9/2016 |
| KR | 101859852 B1 | 5/2018 |
| KR | 20180093808 A | 8/2018 |
| KR | 20180131310 A | 12/2018 |
| KR | 102082674 B1 | 2/2020 |

OTHER PUBLICATIONS

Written Opinion for related International Application No. PCT/KR2021/008612; report dated Jan. 13, 2022; (3 pages).

Holto, et al; Electrical Treeing in Extruded Polypropylene High Voltage Cable Insulation; IEEE; 2010; (4 pages).

Zhong, et al.; "Effects of Revulcanization on XLPE Crystalline Morphology and AC Breakdown Performance"; IEEE; 2018; (5 pages).

Liu, et al.; DC Electrical Breakdown Dependence on the Radial Position of Specimens within HVDC XLPE Cable Insulation; IEEE; 2017; (9 pages).

Extended European Search Report for related European Application No. 21838322.2; action dated Jun. 20, 2024; (8 pages).

* cited by examiner

HIGH-VOLTAGE POWER CABLE

CROSS-REFERENCE TO RELATED APPLICATIONS

The present application is a National Stage of International Application No. PCT/KR2021/008612 filed on Jul. 6, 2021, which claims the benefit of Korean Patent Application No. 10-2020-0083484, filed on Jul. 7, 2020, and Korean Patent Application No. 10-2021-0088557 filed on Jul. 6, 2021, with the Korean Intellectual Property Office, the entire contents of each hereby incorporated by reference.

FIELD

The present disclosure relates to a high-voltage power cable. Specifically, the present disclosure relates to a high-voltage power cable that exhibits excellent dielectric strength, such as dielectric breakdown voltage and impulse breakdown strength, and that is capable of implementing and maintaining dielectric characteristics even when a temperature of a cable insulator rises due to the transmission of power or when negative impulse or polarity reversal occurs.

BACKGROUND

In general, in a large power system requiring large-capacity and long-distance power transmission, high voltage transmission is necessary to increase a transmission voltage in terms of a reduction of power loss, a construction site problem, and an increase in power transmission capacity.

Power transmission methods may be largely divided into an alternating current (AC) transmission method and a direct current (DC) transmission method. Specifically, the AC transmission method is a method of directly transmitting AC power from a transmitting side, whereas the DC transmission method is a method of converting AC power from a transmitting side into an appropriate voltage, converting the appropriate voltage into DC power through a converter, transmitting the DC power to a receiving side through a transmission line, and converting the DC power into AC power by the receiving side through an inverter.

In particular, the DC transmission method is advantageous in transmitting a large amount of power over a long distance, allows a connection between asynchronous power systems, reduces power loss, and secures high stability, whereas the AC transmission method allows a voltage to be easily increased or reduced, allows a rotating field to be easily obtained, and secures consistent operation.

However, in both the AC transmission method and the DC transmission method, power is transmitted using a high-voltage transmission cable and thus dielectric breakdown or the like may occur at a voltage lower than an initially set dielectric breakdown voltage, thus resulting in a significant degradation of insulating properties of a cable insulator, when a temperature of the cable insulator increases or when negative impulse or polarity reversal occurs, and such dielectric breakdown may occur due to other various causes (including unknown causes).

Therefore, there is an urgent demand for a high-voltage power cable that exhibits excellent dielectric strength, such as dielectric breakdown voltage and impulse breakdown strength, and that is capable of implementing and maintaining dielectric characteristics even when a temperature of a cable insulator rises due to the transmission of power or when negative impulse or polarity reversal occurs.

SUMMARY

The present disclosure is directed to providing a high-voltage power cable that exhibits excellent dielectric strength, such as dielectric breakdown voltage and impulse breakdown strength, and that is capable of implementing and maintaining dielectric characteristics even when a temperature of a cable insulator rises due to the transmission of power or when negative impulse or polarity reversal occurs.

According to an aspect of the present disclosure,
provided is a high-voltage power cable comprising: a conductor; and an insulation layer covering the conductor, wherein when the insulating layer is divided into three equal parts to obtain an inner layer, an intermediate layer, and an outer layer according to a thickness, the difference in crystallinity between a layer with highest crystallinity and a layer with lowest crystallinity is 10% or less.

According to another aspect of the present disclosure, provided is the high-voltage power cable, wherein the insulating layer comprises crosslinked polyethylene (XLPE) as a base resin, and
the crystallinity is defined by the following Equation 1:

$$\text{crystallinity (\%)} = \{\Delta H \text{ (J/g) of a sample of each insulating layer}/\Delta H \text{ (J/g) of 100\% crystallized insulating layer sample}\} \times 100, \quad \text{[Equation 1]}$$

In the above equation 1,
wherein $\Delta H$ denotes a value obtained by obtaining a primary heating curve for an insulating layer sample at a temperature of 30 to 200° C. and a heating rate of 10° C./min using differential scanning calorimeter (DSC) equipment and integrating an endothermic peak in a temperature range of 20 to 120° C. in the primary heating curve.

According to other aspect of the present disclosure, provided is the high-voltage power cable, wherein the insulating layer comprises non-crosslinked polypropylene (PP) as a base resin, and
the crystallinity is defined by the following Equation 1:

$$\text{crystallinity (\%)} = \{\Delta H \text{ (J/g) of a sample of each insulating layer}/\Delta H \text{ (J/g) of 100\% crystallized insulating layer sample}\} \times 100, \quad \text{[Equation 1]}$$

In the above equation 1,
wherein $\Delta H$ denotes a value obtained by obtaining a primary heating curve for an insulating layer sample at a temperature of 30 to 200° C. and a heating rate of 10° C./min using differential scanning calorimeter (DSC) equipment and integrating an endothermic peak in a temperature range of 100 to 170° C. in the primary heating curve.

According to other aspect of the present disclosure, provided is the high-voltage power cable, wherein crystallinity of each of the inner layer, the intermediate layer, and the outer layer is independently in a range of 34 to 47%.

According to other aspect of the present disclosure, provided is the high-voltage power cable, further comprising an inner semiconducting layer covering the conductor, the insulating layer covering the inner semiconducting layer, an outer semiconducting layer covering the insulating layer, a shielding layer covering the outer semiconducting layer, and an outer cover covering the shielding layer.

According to other aspect of the present disclosure, provided is the high-voltage power cable, wherein the insulating layer is formed from an insulation composition an polyolefin resin as the base resin.

According to other aspect of the present disclosure, provided is the high-voltage power cable, wherein the insulating layer is formed from crosslinked polyethylene resin.

A high-voltage power cable according to the present disclosure exhibits excellent dielectric strength, such as dielectric breakdown voltage and impulse breakdown strength, due to crystallinity of an insulating layer that is precisely designed in a new way, and is capable of implementing and maintaining insulation characteristics even when a temperature of a cable insulator increases due to transmission of power or when negative impulse or polarity reversal occurs.

DETAILED DESCRIPTION

Hereinafter, example embodiments of the present disclosure will be described in detail. The present disclosure is, however, not limited thereto and may be embodied in many different forms. Rather, the embodiments set forth herein are provided so that this disclosure may be thorough and complete and fully convey the scope of the disclosure to those skilled in the art. Throughout the specification, the same reference numbers represent the same elements.

Figure 1:
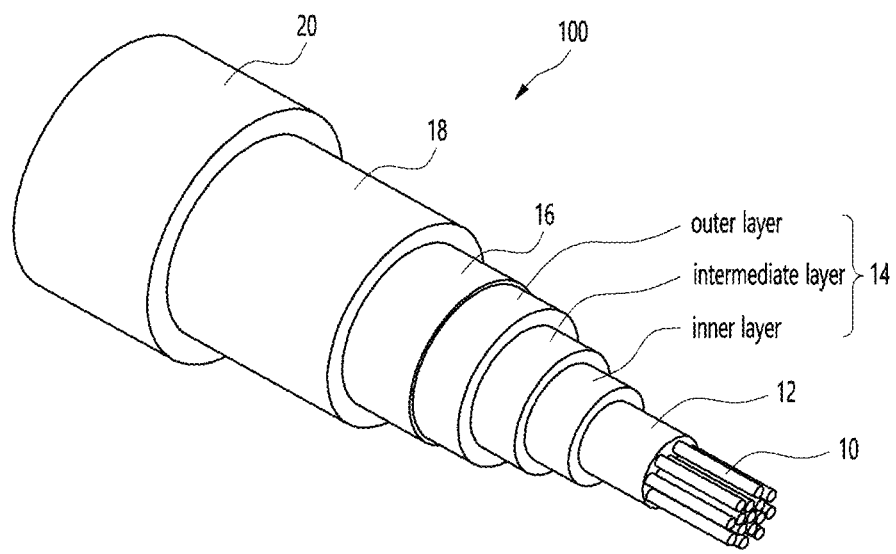
FIG. 1 is a schematic cross-sectional view of a high-voltage power cable according to an embodiment of the present disclosure.

FIG. 1 is a schematic cross-sectional view of a high-voltage power cable according to an embodiment of the present disclosure. As illustrated in FIG. 1, a high-voltage power cable 100 according to the present disclosure may include a center conductor 10, an inner semiconducting layer 12 covering the center conductor 10, an insulating layer 14 covering the inner semiconducting layer 12, an outer semiconducting layer 16 covering the insulating layer 14, a shielding layer 18 covering the outer semiconducting layer 16 and formed of a metal sheath or a neutral wire for electrical shielding and a return for short-circuit current, an outer cover 20 covering the shielding layer 18, and the like.

Figure 2:
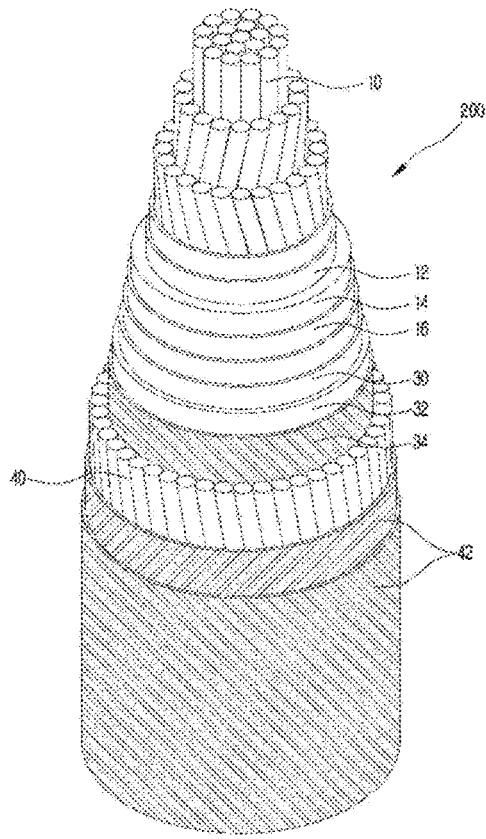
FIG. 2 is a schematic cross-sectional view of a high-voltage power cable according to another embodiment of the present disclosure.

FIG. 2 is a schematic cross-sectional view of a high-voltage power cable according to another embodiment of the present disclosure, in which a schematic cross-sectional view of a submarine cable is shown.

As illustrated in FIG. 2, a conductor 10, an inner semiconducting layer 12, an insulating layer 14, and an outer semiconducting layer 16 of a high-voltage power cable 200 according to the present disclosure are substantially the same as those of the embodiment of FIG. 1 described above and thus a description thereof is omitted here.

A metal sheath formed of lead, so-called a 'lead sheath' 30, is provided on an outer side of the outer semiconducting layer 16 to prevent deterioration of the insulation performance of the insulating layer 14 due to intrusion of a foreign substance such as external water.

Furthermore, a bedding layer 34 is provided on an outer side of the lead sheath 30 to prevent the sheath 32 formed of a resin, such as polyethylene, from being in direct contact with water. A wire sheath 40 may be provided on the bedding layer 34. The wire sheath 40 is provided on an outer side of the cable to increase mechanical strength so as to protect the cable from an external environment at the seabed.

A jacket 42 is provided as an outer cover of the cable on an outer side of the wire sheath 40, i.e., an outer side of the cable. The jacket 42 is provided on the outer side of the cable to protect the internal components of the cable 200. In particular, in the case of a submarine cable, the jacket 42 has high weather resistance and high mechanical strength to withstand a submarine environment such as seawater. For example, the jacket 42 may be formed of polypropylene yarn or the like.

The center conductor 10 may be a single wire formed of copper or aluminum, and preferably, copper, or a stranded wire consisting of a plurality of wires. The specifications of the center conductor 10, e.g., a diameter of the center conductor 10, a diameter of the wires of the stranded wire, etc., may vary according to a transmission voltage, use, etc. of the high-voltage power cable including the center conductor 10, and may be appropriately selected by those of ordinary skill in the art. For example, when the high-voltage power cable according to the present disclosure is used, for example, as a submarine cable requiring installability, flexibility, and the like, the center conductor 10 is preferably a stranded wire having higher flexibility than a single wire.

The inner semiconducting layer 12 is disposed between the center conductor 10 and the insulating layer 14 to eliminate an air layer causing delamination between the center conductor 10 and the insulating layer 14 and alleviate local electric field concentration. The outer semiconducting layer 16 allows a uniform electric field to be applied to the insulating layer 14, alleviates local electric field concentration, and protects the insulating layer 14 of the cable from the outside.

In general, the inner semiconducting layer 12 and the outer semiconducting layer 16 are formed by extrusion of a semiconducting composition in which conductive particles, such as carbon black, carbon nanotubes, carbon nanoplates or graphite, are dispersed in a base resin and a cross-linking agent, an antioxidant, a scorch inhibitor, or the like is additionally added.

Here, the base resin is preferably formed of an olefin resin similar to the base resin of an insulation composition of the insulating layer 14 for interlayer adhesion between the semiconducting layers 12 and 16 and the insulating layer 14. More preferably, the base resin is formed of olefin and a polar monomer, e.g., ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso) propyl acrylate (EPA), ethylene (iso) propyl methacrylate (EPMA), ethylene butyl acrylate (EBA), ethylene butyl methacrylate (EBMA) or the like, in consideration of compatibility with the conductive particles.

In addition, the cross-linking agent may be a silane cross-linking agent or an organic peroxide cross-linking agent, such as dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, or di-t-butyl peroxide.

Specifically, in the high-voltage power cable according to the present disclosure, the amount of a copolymer resin of an olefin and a polar monomer may be precisely adjusted to about 60 to 70% by weight and the amount of the polar monomer is precisely adjusted to 1 to 18% by weight and preferably 1 to 12% by weight, based on the total weight of a semiconductive composition used to form the semiconducting layers 12 and 16, so that the distortion of an electric field due to the accumulation of heterocharges in the insulating layer 14 may be prevented from being aggravated due to the movement of a crosslinking byproduct generated during crosslinking of the semiconducting layers 12 and 16 into the insulating layer 14 through an interface between the semiconducting layers 12 and 16 and the insulating layer 14, thereby avoiding or minimizing a reduction of a dielectric breakdown voltage of the insulating layer 14.

Here, when the amount of the polar monomer is greater than 18 wt %, the accumulation of space charges in the insulating layer 14 may be greatly accelerated, whereas when the amount of the polar monomer is less than 1 wt %, the compatibility between the base resin and the conductive particles may decrease and the extrudability of the semiconducting layers 12 and 16 may decrease and thus semiconducting characteristics may not be achieved.

In the high-voltage power cable according to the present disclosure, in the semiconducting composition of the semiconducting layers 12 and 16, the amount of the cross-linking agent may be accurately adjusted to 0.1 to 5 parts by weight, and preferably, 0.1 to 1.5 parts by weight, based on 100 parts by weight of the base resin.

Here, when the amount of the cross-linking agent is greater than 5 parts by weight, the amount of cross-linking byproducts inevitably generated during crosslinking of the base resin contained in the semiconducting composition may be excessive and move into the insulating layer 14 via the interface between the semiconducting layers 12 and 16 the insulating layer 14 and thus distortion of an electric field may be accelerated due to the accumulation of heterocharges, thereby reducing a dielectric breakdown voltage of the insulating layer 14. In contrast, when the amount of the cross-linking agent is less than 0.1 parts by weight, a degree of cross-linking is insufficient and thus mechanical properties, heat resistance, etc. of the semiconducting layers 12 and 16 may be insufficient.

In the high-voltage power cable according to the present disclosure, the semiconducting composition of each of the inner and outer semiconducting layers 12 and 16 may contain 45 to 70 parts by weight of conductive particles such as carbon black, based on 100 parts by weight of the base resin. When the amount of the conductive particles is less than 45 parts by weight, sufficient semiconducting properties may not be realized, whereas when the amount of the conductive particles is greater than 70 parts by weight, the extrudability of the inner and outer semiconducting layers 12 and 16 may decrease and thus surface properties or productivity may be lowered.

Thicknesses of the inner and outer semiconducting layers 12 and 16 may vary according to a transmission voltage of the cable. For example, in the case of a 345 kV power cable, the thickness of the inner semiconducting layer 12 may be in a range of 1.0 to 2.5 mm and the thickness of the outer semiconducting layer 16 may be in a range of 1.0 to 2.5 mm.

The insulating layer 14 may be formed of, for example, a polyolefin resin, such as polyethylene or polypropylene, as a base resin, and may be preferably formed by extrusion of an insulating composition containing a polyethylene resin.

The polyethylene resin may include ultra-low-density polyethylene (ULDPE), low-density polyethylene (LDPE), linear low-density polyethylene (LLDPE), medium-density polyethylene (MDPE), high-density polyethylene (HDPE), or a combination thereof. Alternatively, the polyethylene resin may include a homopolymer, a random or block copolymer of α-olefin, such as ethylene, propylene, 1-butene, 1-pentene, 1-hexene, or 1-octene, or a combination thereof.

The crosslinking agent may be contained in or may not be contained in the insulating composition, which is used to form the insulating layer 14, according to the base resin, and when the crosslinking agent is contained, the insulating layer 14 may be formed of crosslinked polyolefin (XLPO) and preferably crosslinked polyethylene (XLPE) by a separate crosslinking process during or after extrusion. Alternatively, the insulating composition may further include other additives such as an antioxidant, an extrusion enhancer, and a crosslinking aid.

The cross-linking agent contained in the insulating composition may be the same as that contained in the semiconductive composition, and may be, for example, a silane cross-linking agent or an organic peroxide cross-linking agent, such as dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, or di-t-butyl peroxide. Here, in the insulation composition, the cross-linking agent may be contained in an amount of 0.1 to 5 parts by weight, based on 100 parts by weight of the base resin.

The amounts of the polar monomer and the cross-linking agent of the base resin contained in the semiconducting layers 12 and 16 in contact with the insulating layer 14 may be accurately controlled to suppress generation of heterocharges at the interface between the insulating layer 14 and the semiconducting layers 12 and 16 and reduce accumulation of space charges. Thus, inorganic particles such as magnesium oxide for reducing the space charges may not be contained or the amount thereof may be significantly reduced, thereby suppressing the extrudability of the insulating layer 14 and impulse strength from being reduced due to the inorganic particles.

The thickness of the insulating layer 14 may vary according to the transmission voltage of the power cable. For example, in the case of a 345 kV power cable, the thickness of the insulating layer 14 may be in a range of 23.0 to 31.0 mm.

In general, extrusion, crosslinking, and a cooling process for forming an insulating layer of a cable are carried out according to a process time, crosslinking efficiency, etc. without taking into account uniformity in the crystallinity of the insulating layer. Therefore, the present inventor has recognized that crystallinity deviation may occur in an insulating layer in a conventional insulating layer process, conducted an experiment, and completed the present disclosure by experimentally confirming that non-uniform crystallinity in the insulating layer 14 caused a reduction in dielectric strength, such as dielectric breakdown voltage and impulse breakdown strength, of the insulating layer 14, and particularly, a reduction in insulating properties when a temperature of a cable insulator increased due to the transmission of power or when negative impulse or polarity reversal occurred, insulating properties were likely to decrease as crystallinity deviation between layers increased, particularly when the insulating layer 14 was divided into three equal parts, i.e., an inner layer, an intermediate layer, and an outer layer, according to a thickness, and insulating properties were maintained during the operation of the cable when the insulating layer 14 was divided into three equal parts, i.e., an inner layer, an intermediate layer, and an outer layer, according to a thickness and the difference in crystallinity between a layer with highest crystallinity and a layer with lowest crystallinity was 10% or less.

For example, when the insulating layer 14 is divided into three equal parts, i.e., an inner layer, an insulating layer, and an outer layer, the crystallinity of each of the inner layer, the insulating layer, and the outer layer may be independently in a range of 34 to 47%. Here, the crystallinity of each layer of the insulating layer 14 may be measured using differential scanning calorimeter (DSC) equipment.

Figure 3:
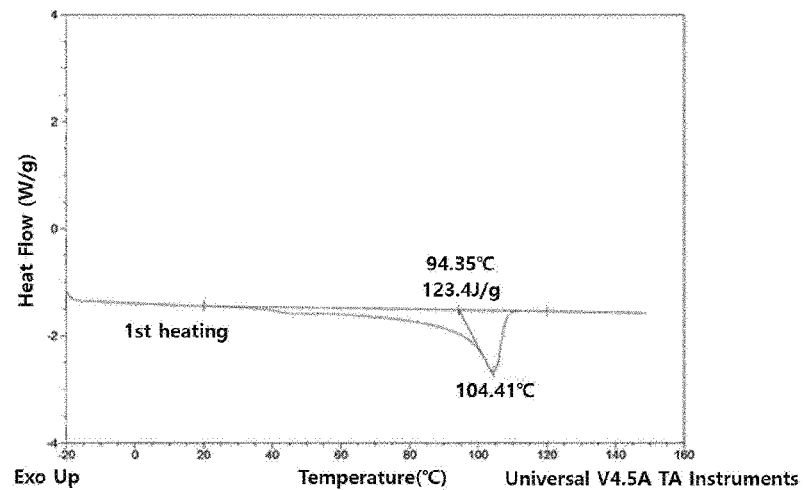
FIG. 3 is a graph showing the crystallinity of each layer of an insulating layer measured using differential scanning calorimeter (DSC).

Specifically, when the insulating layer 14 contains cross-linked polyethylene (XLPE) as a base resin, a primary heating curve shown in FIG. 3 for a sample of each of the inner layer, the intermediate layer, and the outer layer of the insulating layer 14 may be obtained at a temperature of 30 to 200° C. and a heating rate of 10° C./min using the DSC equipment, an integral value ΔH of an endothermic peak in a temperature range of 20 to 120° C. may be calculated, and the crystallinity of each of the inner layer, the intermediate layer, and the outer layer may be calculated by Equation 1 below.

crystallinity (%)={ΔH (J/g) of a sample of each insulating layer/ΔH (J/g) of 100% crystallized insulating layer sample}×100, [Equation 1]

Here, when the crystallinity of the XLPE is calculated, ΔH of the 100% crystallized insulating layer sample may be 293 J/g.

When the insulating layer 14 contains non-crosslinked polypropylene (PP) as a base resin, a primary heating curve for a sample of each of the inner layer, the intermediate layer, and the outer layer of the insulating layer 14 may be obtained at a temperature of 30 to 200° C. and a heating rate of 10° C./min using the DSC equipment, an integral value ΔH of an endothermic peak in a temperature range of 100 to 170° C. may be calculated, and the crystallinity of each of the inner layer, the intermediate layer, and the outer layer may be calculated by Equation 1 above. Here, when the crystallinity of the non-crosslinked polypropylene is calculated, ΔH of the 100% crystallized insulating layer sample may be 207 J/g.

When crystallinity is measured, multiple samples of an inner layer, an intermediate layer, and an outer layer of an insulating layer of a cable may be prepared and an average of crystallinities of these samples may be determined as the crystallinity of each layer. For example, one or more samples of each of a part of a cross section of the inner layer close to a conductor, a part of the cross section of the inner close to the intermediate layer, and a midpoint on the cross section of the inner layer may be prepared.

The insulating layer 14 may be formed by extruding, cross-linking and cooling of an insulation composition, and the crystallinity of each layer may be controlled by adjusting the types and amounts of a base resin of the insulating composition, a crosslinking agent, etc. and adjusting speed during extrusion/crosslinking/cooling, temperature and time conditions for each section of a crosslinked region during crosslinking, and temperature and time conditions for each section in a cooling region during cooling.

For example, during extrusion/crosslinking/cooling, a reduction in flux may result in an increase in a crosslinking time and a cooling time in a crosslinked region and a cooled region and thus a crosslinking temperature may decrease during crosslinking, thus sufficiently implementing crosslinking under sufficient temperature and time conditions, and at the same time, the difference in temperature between an end of the crosslinked region and a start of the cooled region may be minimized to cool the insulating layer 14 slowly, thereby increasing total crystallinity.

Alternatively, a temperature of each section of the crosslinked region during crosslinking may be controlled to minimize the temperature difference between the end of the crosslinked region and the start of the cooled region, so that the insulating layer 14 may be cooled slowly, thereby increasing total crystallinity.

In addition, the crystallinity of each of the inner layer, the intermediate layer, and the outer layer may be controlled by taking into account a state and behavior according to the arrangement of the inner layer, the intermediate layer, and the outer layer, i.e., states and behaviors of the inner layer closest to the conductor, the intermediate layer most stably acting between the inner layer and the outer layer, and the outer layer exposed to the outside.

The jacket layer 20 may include polyethylene, polyvinyl chloride, polyurethane, or the like. For example, the jacket layer 20 may be formed of, preferably, a polyethylene resin, and more preferably, a high-density polyethylene (HDPE) resin in consideration of mechanical strength because the jacket layer 20 is provided on an outermost side of the cable. The jacket layer 20 may contain a small amount of an additive such as carbon black, for example, 2 to 3 wt % of the additive, to achieve a color of the high-voltage power cable, and have a thickness of, for example, 0.1 to 8 mm.

EXAMPLES

1. Preparation Example

An XLPE cable sample including a conductor 400 SQ, an insulating layer having a thickness of 4 mm, and inner and outer semiconducting layers each having a thickness of 1 mm was manufactured. Here, the crystallinity of each layer was adjusted as shown in Table 1 below by controlling a temperature and flux of each section during crosslinking/cooling of the insulating layer of the XLPE cable sample. Nine samples were manufactured from an inner layer, an intermediate layer, and an outer layer of the insulating layer of the XLPE cable sample, the crystallinities of the nine samples were calculated using Equation 1 above, and an average of the crystallinities of the nine samples was determined as the crystallinity of each layer. For example, in the case of the inner layer, three samples were manufactured from each of a part of a cross section of the inner layer close to the conductor, a part of the cross section of the inner layer close to the intermediate layer, and a midpoint on the cross section of the inner layer, and an average of the crystallinities of nine samples was determined the crystallinity of the inner layer. The crystallinity of each of the intermediate layer and the outer layer was measured in the same manner as the inner layer.

TABLE 1

|  | Example 1 | Example 2 | Example 3 | Comparative example 1 |
|---|---|---|---|---|
| Crystallinity of outer layer | 41 | 42 | 41 | 42 |
| Crystallinity of intermediate layer | 43 | 44 | 44 | 43 |
| Crystallinity of inner layer | 38 | 36 | 34 | 32 |
| crystallinity deviation (Max.-Min.) | 5% | 8% | 10% | 11% |

2. Evaluation of AC Dielectric Breakdown Voltage

Figure 4:
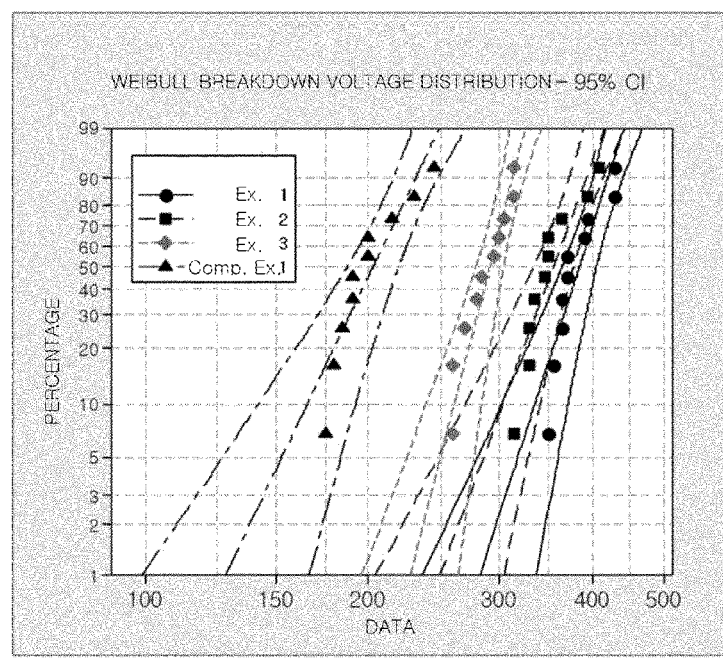
FIG. 4 is a graph showing Weibull breakdown voltage distributions of cables of Examples and Comparative Example.

A breakdown voltage of each of cable samples of Examples and Comparative Example was measured through a Weibull analysis, and a result of the measurement is shown in Table 2 and FIG. 4 below.

TABLE 2

|  | Example 1 | Example 2 | Example 3 | Comparative example 1 |
|---|---|---|---|---|
| Weibull breakdown voltage (63.2%, kV) | 395.4 | 366.3 | 297.7 | 211.1 |
| Weibull shape parameter | 13.68 | 11.98 | 17.09 | 9.204 |

As shown in Table 2 above, it was confirmed that a Weibull breakdown voltage (an average of 63.2%) was about 300 KΩ in the case of the cable samples of Examples 1 to 3 in which crystallinity deviation, which is the difference in crystallinity between a layer with highest crystallinity and a layer with lowest crystallinity among an outer layer, an intermediate layer, and an inner layer of an insulating layer, was 10% or less, whereas a Weibull breakdown voltage (an average of 63.2%) decreased sharply in the case of the cable sample of Comparative Example 1 in which crystallinity deviation was greater than 10%. In addition, as shown in FIG. 4, in the case of a Weibull breakdown voltage distribution (reliability of 95%), shape parameters, which are slopes of distribution curves of the Weibull breakdown voltages of Examples 1 to 3, were greater than that of the Weibull breakdown voltage of Comparative Example 1, i.e., the Weibull breakdown voltages of Examples 1 to 3 were evenly distributed almost in a vertical line. Accordingly, it was confirmed that the dielectric breakdown voltages of the cable samples of Examples 1 to 3 were stable and uniform.

Furthermore, Weibull breakdown voltage error ranges of Examples 1 to 3 partially overlap and thus the difference there between is not considered to be significant, but a Weibull breakdown voltage error range of Comparative Example 1 does not overlap the Weibull breakdown voltage error ranges of Examples 1 to 3. Thus, it was confirmed that there is a significant difference between the cable sample of Comparative Example 1 in which the crystallinity of each layer of the insulating layer was greater than 10% and the cable samples of Examples 1 to 3 in terms of a dielectric breakdown voltage.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. A high-voltage power cable comprising:
   a conductor;
   an inner semiconducting layer, covering the conductor;
   an insulating layer, covering the inner semiconducting layer, which comprises crosslinked polyethylene (XLPE) or non-crosslinked polypropylene (PP);
   an outer semiconducting layer, covering the insulating layer;
   a shielding layer, covering the outer semiconducting layer; and
   an outer cover, covering the shielding layer;
   wherein when the insulating layer is divided into three equal parts to obtain an inner layer, an intermediate layer, and an outer layer according to a thickness, the difference in crystallinity between a layer with highest crystallinity and a layer with lowest crystallinity is 10% or less.

2. The high-voltage power cable of claim 1, wherein when the insulating layer comprises crosslinked polyethylene (XLPE) as a base resin, and
   the crystallinity is defined by the following Equation 1:

crystallinity (%)={Δ$H$ (J/g) of a sample of each insulating layer/Δ$H$ (J/g) of 100% crystallized insulating layer sample}×100, [Equation 1]

wherein Δ$H$ denotes a value obtained by obtaining a primary heating curve for an insulating layer sample at a temperature of 30 to 200° C. and a heating rate of 10° C./min using differential scanning calorimeter (DSC) equipment and integrating an endothermic peak in a temperature range of 20 to 120° C. in the primary heating curve.

3. The high-voltage power cable of claim 2, wherein crystallinity of each of the inner layer, the intermediate layer, and the outer layer is independently in a range of 34 to 47%.

4. The high-voltage power cable of claim 1, wherein when the insulating layer comprises non-crosslinked polypropylene (PP) as a base resin, and
   the crystallinity is defined by the following Equation 1:

crystallinity (%)={Δ$H$ (J/g) of a sample of each insulating layer/Δ$H$ (J/g) of 100% crystallized insulating layer sample}×100, [Equation 1]

wherein Δ$H$ denotes a value obtained by obtaining a primary heating curve for an insulating layer sample at a temperature of 30 to 200° C. and a heating rate of 10° C./min using differential scanning calorimeter (DSC) equipment and integrating an endothermic peak in a temperature range of 100 to 170° C. in the primary heating curve.

* * * * *